(12) United States Patent
McDonald et al.

(10) Patent No.: US 7,326,736 B2
(45) Date of Patent: Feb. 5, 2008

(54) COMPOSITE PROTON EXCHANGE MEMBRANE AND METHOD OF MANUFACTURING THE SAME

(75) Inventors: Robert C. McDonald, Stow, MA (US); Anthony B. LaConti, Lynnfield, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 610 days.

(21) Appl. No.: 10/627,229

(22) Filed: Jul. 25, 2003

(65) Prior Publication Data

US 2004/0115498 A1    Jun. 17, 2004

Related U.S. Application Data

(60) Provisional application No. 60/423,506, filed on Nov. 4, 2002.

(51) Int. Cl.
*C08J 7/14* (2006.01)
(52) U.S. Cl. ........................................ 521/27
(58) Field of Classification Search ................... 521/27
See application file for complete search history.

(56) References Cited

U.S. PATENT DOCUMENTS

| | | | |
|---|---|---|---|
| 3,282,875 A | 11/1966 | Connolly et al. | |
| 4,178,218 A * | 12/1979 | Seko | ........................ 205/520 |
| 4,470,889 A | 9/1984 | Ezzell et al. | |
| 4,478,695 A | 10/1984 | Ezzell et al. | |
| 4,832,805 A | 5/1989 | LaConti et al. | |
| 5,045,171 A | 9/1991 | MacDonald | |
| 5,863,672 A * | 1/1999 | Ledjeff et al. | ................ 429/26 |
| 6,011,074 A * | 1/2000 | Sorenson et al. | ............ 521/26 |
| 6,025,457 A * | 2/2000 | Ohno et al. | ................ 528/170 |
| 6,179,986 B1 | 1/2001 | Swette et al. | |
| 6,492,431 B1 | 12/2002 | Cisar | |
| 6,495,209 B1 | 12/2002 | Cisar | |
| 2004/0116546 A1 | 6/2004 | Kosek et al. | |

OTHER PUBLICATIONS

Chapters 1, 5 and 6 (pp. 3-38, 143-156 and 157-180, respectively) of Interpenetrating Polymer Networks, edited by D. Klempner, L.H. Sperling and L.A. Utracki, Advances in Chemistry Series No. 239, American Chemical Society, Washington, DC (1994).

* cited by examiner

Primary Examiner—Bruce F. Bell
(74) Attorney, Agent, or Firm—Kriegsman & Kriegsman

(57) ABSTRACT

A composite proton exchange membrane and method of manufacturing the same. The composite proton exchange membrane comprises a proton exchange membrane which has been modified by replacing membrane protons in desired areas of the membrane with a cationic polymer. The cationic polymer is preferably formed by introducing a quaternary salt monomer into the membrane and then effecting the polymerization of the monomer. The modified areas of the proton exchange membrane exhibit increased strength, reduced water and gas permeability, reduced proton conductivity and reduced acidity. Accordingly, by modifying the periphery of the membrane, one can obtain an integral sealing edge for the membrane, and by modifying certain interior regions of the membrane, one can divide the membrane into a plurality of sealed segments.

16 Claims, 6 Drawing Sheets

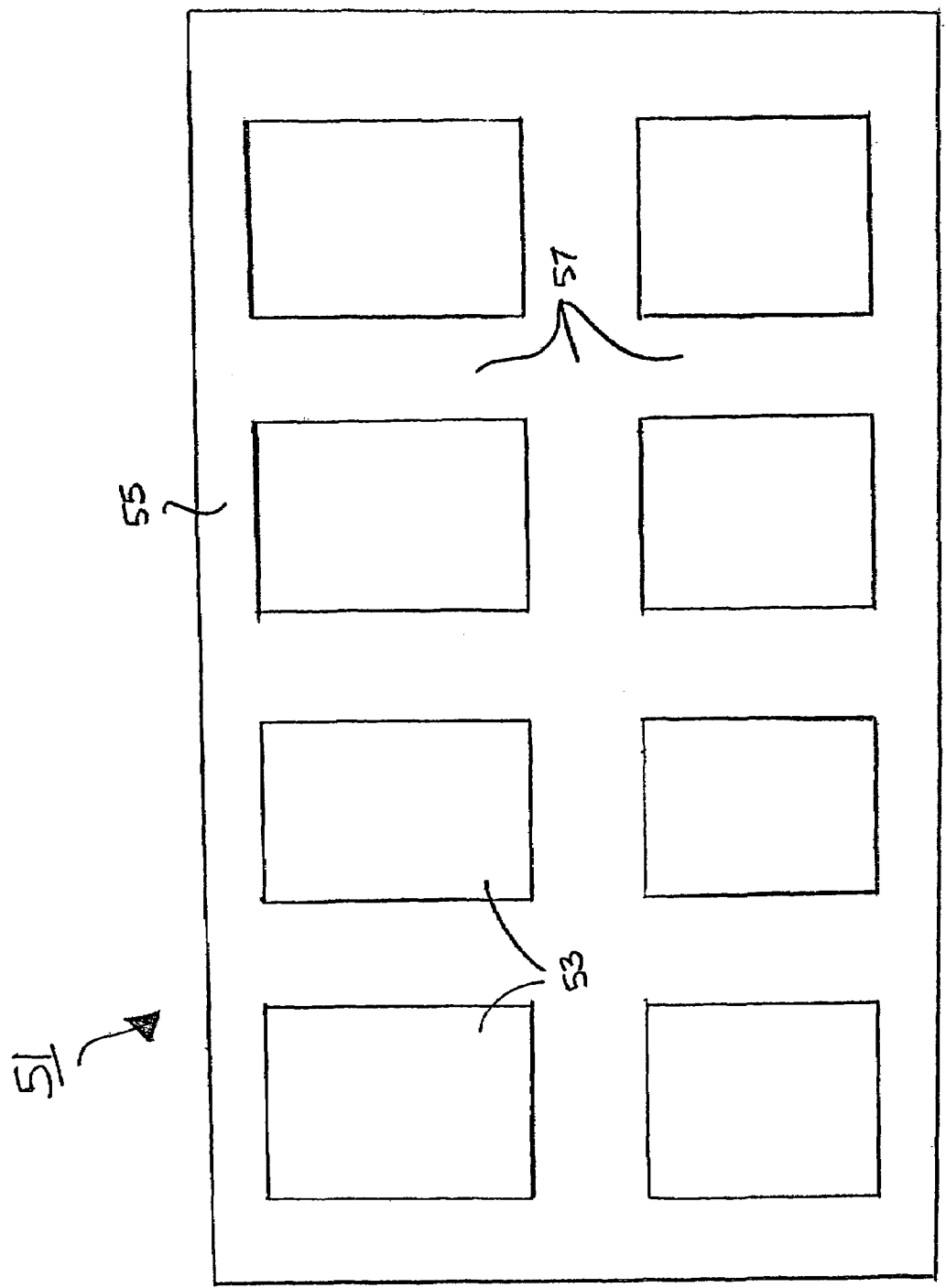

COMPOSITE PROTON EXCHANGE MEMBRANE AND METHOD OF MANUFACTURING THE SAME

CROSS-REFERENCE TO RELATED APPLICATIONS

The present application claims the benefit under 35 U.S.C. 119(e) of U.S. Provisional Patent Application Ser. No. 60/423,506, filed Nov. 4, 2002, the disclosure of which is incorporated herein by reference.

STATEMENT OF FEDERALLY SPONSORED RESEARCH

The U.S. Government has a paid-up license in this invention and the right in limited circumstances to require the patent owner to license others in reasonable terms as provided by the terms of Grant Numbers DMI-0128583 and DMI-0239174 awarded by the National Science Foundation.

BACKGROUND OF THE INVENTION

The present invention relates generally to proton exchange membranes of the type suitable for use in electrochemical devices, such as fuel cells, and relates more particularly to a novel proton exchange membrane.

Fuel cells are electrochemical devices in which a free energy change resulting from a fuel oxidation reaction is converted into electrical energy. Because of their comparatively high inherent efficiencies and comparatively low emissions, fuel cells are presently receiving considerable attention as a possible alternative to the combustion of nonrenewable fossil fuels in a variety of applications.

A typical fuel cell comprises a fuel electrode (i.e., anode) and an oxidant electrode (i.e., cathode), the two electrodes being separated by an electrolyte that is a good conductor of ions but a poor conductor of electrons. The electrodes are connected electrically to a load, such as an electronic circuit, by an external circuit conductor. Oxidation of the fuel at the anode produces electrons that flow through the external circuit to the cathode producing an electric current. The electrons react with an oxidant at the cathode. In theory, any substance capable of chemical oxidation that can be supplied continuously to the anode can serve as the fuel for the fuel cell, and any material that can be reduced at a sufficient rate at the cathode can serve as the oxidant for the fuel cell.

In one well-known type of fuel cell, sometimes referred to as a hydrogen fuel cell, gaseous hydrogen serves as the fuel, and gaseous oxygen, which is typically supplied from the air, serves as the oxidant. The electrodes in a hydrogen fuel cell are typically porous to permit the gas-electrolyte junction to be as great as possible. At the anode, incoming hydrogen gas ionizes to produce hydrogen ions and electrons. Since the electrolyte is a non-electronic conductor, the electrons flow away from the anode via the external circuit, producing an electric current. At the cathode, oxygen gas reacts with hydrogen ions migrating through the electrolyte and the incoming electrons from the external circuit to produce water as a byproduct. The overall reaction that takes place in the fuel cell is the sum of the anode and cathode reactions, with part of the free energy of reaction being released directly as electrical energy and with another part of the free energy being released as heat at the fuel cell.

In another well-known type of fuel cell, sometimes referred to as a direct organic fuel cell, an organic fuel is oxidized at the anode. One of the more common organic fuels is methanol although ethanol, propanol, isopropanol, trimethoxymethane, dimethoxymethane, dimethyl ether, trioxane, formaldehyde, and formic acid are also suitable for use. During operation of a typically direct methanol fuel cell, a mixture of methanol and water is circulated over the anode. The circulation of the methanol/water mixture over the anode causes electrons to be released in the following electrochemical reaction:

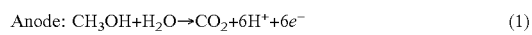

$$\text{Anode: } CH_3OH + H_2O \rightarrow CO_2 + 6H^+ + 6e^- \quad (1)$$

Carbon dioxide produced by the above reaction is then discharged from the fuel cell, together with any excess methanol/water mixture. (The carbon dioxide is then typically separated from the methanol/water mixture, and the methanol/water mixture is then typically re-circulated to the anode using a pump.) At the same time the electrochemical reaction described in equation (1) above is occurring, gaseous oxygen (or air) is circulated over the cathode. The circulation of oxygen over the cathode causes electrons to be captured in the following electrochemical reaction:

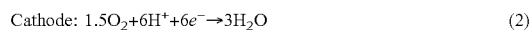

$$\text{Cathode: } 1.5O_2 + 6H^+ + 6e^- \rightarrow 3H_2O \quad (2)$$

Excess oxygen (or air) and water are then discharged from the fuel cell. (The water may be recovered from the effluent air stream by a water/gas separator and/or by a condenser.) The individual electrode reactions described by equations (1) and (2) result in the following overall reaction for the fuel cell, with a concomitant flow of electrons:

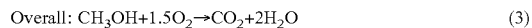

$$\text{Overall: } CH_3OH + 1.5O_2 \rightarrow CO_2 + 2H_2O \quad (3)$$

Although the electrolyte of a fuel cell may be a liquid electrolyte, more commonly the electrolyte of a fuel cell is a solid polymer electrolyte or proton exchange membrane (PEM). The advantages of using a PEM, as opposed to a liquid electrolyte, in a fuel cell are numerous. For example, PEMs are simpler and more compact than most liquid electrolytes. In addition, the use of a PEM, instead of a liquid electrolyte, simplifies fluid management and eliminates the potential of corrosive liquids. Furthermore, fuel cells containing PEMs are capable of being operated at temperatures close to room temperature (typically around 80° C.) whereas fuel cells containing liquid electrolytes typically must be operated at temperatures far exceeding room temperature. One of the more common types of PEMs is a perfluorosulfonic acid (PFSA) polymer, said PFSA polymer being formed by the copolymerization of tetrafluoroethylene and perfluorovinylether sulfonic acid. See e.g., U.S. Pat. No. 3,282,875, inventors Connolly et al., issued Nov. 1, 1966; U.S. Pat. No. 4,470,889, inventors Ezzell et al., issued Sep. 11, 1984; U.S. Pat. No. 4,478,695, inventors Ezzell et al., issued Oct. 23, 1984; U.S. Pat. No. 6,492,431, inventor Cisar, issued Dec. 10, 2002, all of which are incorporated herein by reference. A commercial embodiment of a perfluorosulfonic acid polymer PEM is available from DuPont (Wilmington, Del.) as NAFION® PFSA polymer.

Although proton exchange membranes and, in particular, PFSA proton exchange membranes are generally satisfactory as the electrolyte of a fuel cell, there nonetheless remains room for improvement in certain properties of PEMs. For example, one common difficulty associated with PEMs is that PEMs have a tendency to tear, especially when being handled (as is the case during assembly of a fuel cell) or in stressed areas where compression is applied thereto (as is the case in peripheral areas of PEMs sealed under pressure to other fuel cell components). Because the tendency to tear is greatest when PEMs are wet and because PEMs must be wet in order to function properly, one approach to this problem has been to assemble fuel cells with dry PEMs and then to subject the PEMs to a humidification process. This approach, however, has its own shortcomings. One such shortcoming is that the dry assembly requires special moisture-free facilities, such as a "dry room." Another such shortcoming is that the humidification process is time-consuming. Still another such shortcoming is that the humidification process typically results in the PEM swelling in a non-uniform manner, thereby creating stress in some areas of the PEM and introducing irregularities in the contact pressure applied over the entire active surface area of the PEM. (When the contact pressure is not uniform over the entire active surface area of the PEM, the performance of the fuel cell is adversely affected.) As can readily be appreciated, such irregularities are amplified where humidification is applied to a plurality of PEM-containing fuel cells arranged in a stack.

Another common difficulty associated with PEMs is that PEMs have a tendency to be permeable to gases and water. Such permeability is undesirable as it may result in un-oxidized fuel entering the PEM and then escaping from the fuel cell through the peripheral edges of the PEM, thereby resulting in fuel loss (and, in the case of some fuels like hydrogen gas, in the escape of a highly combustible gas), and/or may result in water leaking from the PEM, thereby degrading PEM performance. One of the approaches to addressing this problem of leakage or permeability is compressing, under great pressure, the peripheral edges of the PEM between a pair of silicone gaskets, which are, in turn, compressed under great pressure between the edges of a pair of rigid, non-porous, conductive substrates patterned with flow fields. (In some cases, the mating faces of the PEM are additionally machined or molded into ridges to facilitate compression of the PEM.) The foregoing approach, however, is inadequate to address sufficiently the problems of fuel loss and water leakage. Moreover, as explained above, the high pressure used to compress the PEM can cause the PEM to be physically stressed to an extent where tearing is more likely. As can readily be appreciated, the tearing of the PEM is likely to result in the additional loss of gases and water from the PEM.

Still another common difficulty associated with PEMs, particularly strongly acidic PEMs like perfluorosulfonic acid (PFSA) PEMs, is that there is a tendency for the acidic PEMs to react chemically with the silicone gaskets contacted therewith. Such a chemical reaction results in the degradation of the silicone gaskets and in the contamination of the PEM, both results being highly undesirable.

Often, a number of fuel cells are assembled together in order to meet desired voltage and current requirements. One common type of assembly, often referred to as a bipolar stack, comprises a plurality of stacked fuel cells that are electrically connected in series in a bipolar configuration. Another common type of assembly, often referred to as a segmented fuel cell or planar fuel cell, comprises two or more sets of electrodes contacted with a common PEM, the electrode sets being separated by uncatalyzed border areas. Each electrode set bonded to the common PEM comprises a cell. The cells are then connected in series or in parallel to achieve a desired voltage and current. As can readily be appreciated, a segmented fuel cell has the advantage of being more compact than a bipolar stack. In addition, a segmented fuel cell permits designs which form on planar or curved surfaces. Unfortunately, however, the progress of segmented fuel cells has been hampered by the presence of mobile protons and water in the uncatalyzed border areas, which promotes the occurrence of electrolytic leakage paths between the catalyzed areas or cells, and by the crossover, in the uncatalyzed border areas, of gas reactants from one cell to another cell.

SUMMARY OF THE INVENTION

It is an object of the present invention to provide a novel proton exchange membrane of the type that is well-suited for use in electrochemical devices, such as fuel cells.

It is another object of the present invention to provide a proton exchange membrane of the type described above that overcomes at least some of the drawbacks discussed above in connection with existing proton exchange membranes.

Therefore, according to one aspect of the invention, there is provided a novel proton exchange membrane, said novel proton exchange membrane being a composite proton exchange membrane prepared by a process comprising the steps of (a) providing a proton exchange membrane; (b) introducing a cationic monomer into one or more desired areas of the proton exchange membrane; and (c) effecting the polymerization of the cationic monomer.

In a preferred embodiment, the proton exchange membrane is a perfluorosulfonic acid membrane, and the cationic monomer is a quaternary salt monomer. Preferred quaternary salt monomers include salts of acrylic, methacrylic or ethynyl esters of quaternary ammonium alkanes and salts of acrylic, methacrylic or ethynyl esters of quaternary ammonium heterocycles.

The cationic monomer may be introduced into the one or more desired areas of the proton exchange membrane, for example, by dipping only the desired area(s) of the membrane in a solution containing the cationic monomer. Alternatively, the area(s) of the proton exchange membrane one does not wish to modify may be masked, and a portion of the proton exchange membrane or the entire proton exchange membrane may then be soaked in a solution containing the cationic monomer.

The polymerization of the cationic monomer within the membrane may be promoted by heating the membrane, by irradiating the membrane, or by adding a polymerization catalyst to the membrane. Alternatively, the monomer may simply be allowed to polymerize over time.

The modified areas of the proton exchange membrane exhibit increased strength, reduced water and gas permeability, reduced proton conductivity and reduced acidity. Accordingly, by modifying the periphery of the membrane, one can obtain an integral sealing edge for the membrane, and by modifying certain interior regions of the membrane, one can divide the membrane into a plurality of sealed segments.

According to another aspect of the invention, there is provided a composite proton exchange membrane, said composite proton exchange membrane comprising (a) a proton exchange membrane; and (b) a cationic polymer incorporated into an area of the proton exchange membrane, said cationic polymer replacing membrane protons in said area of said proton exchange membrane.

The present invention is also directed to methods for preparing the composite proton exchange membranes described above, to membrane electrode assemblies incorporating the above-described composite proton exchange membranes, and to electrochemical devices incorporating the above-described composite proton exchange membranes, such electrochemical devices including, but not being limited to, fuel cells, electrolyzers, electrochemical gas concentrators/compressors (pumps), sensors, supercapacitors, ultracapacitors, and industrial electrochemical process units.

For purposes of the present specification and claims, it is to be understood that certain relational terms used herein, such as "on," "over," and "in front of," when used to denote the relative positions of two or more components of an electrochemical device, such as a fuel cell, are used to denote such relative positions in a particular orientation and that, in a different orientation, the relationship of said components may be reversed or otherwise altered.

In addition, for purposes of the present specification and claims, it is to be understood that the term "proton exchange membrane" is to be construed to be interchangeable with the term "cation exchange membrane," unless specifically denoted otherwise.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts:

FIG. 2(a) is a schematic top view of a second embodiment of a composite proton exchange membrane constructed according to the teachings of the present invention;

DETAILED DESCRIPTION OF PREFERRED EMBODIMENTS

Figure 1A:
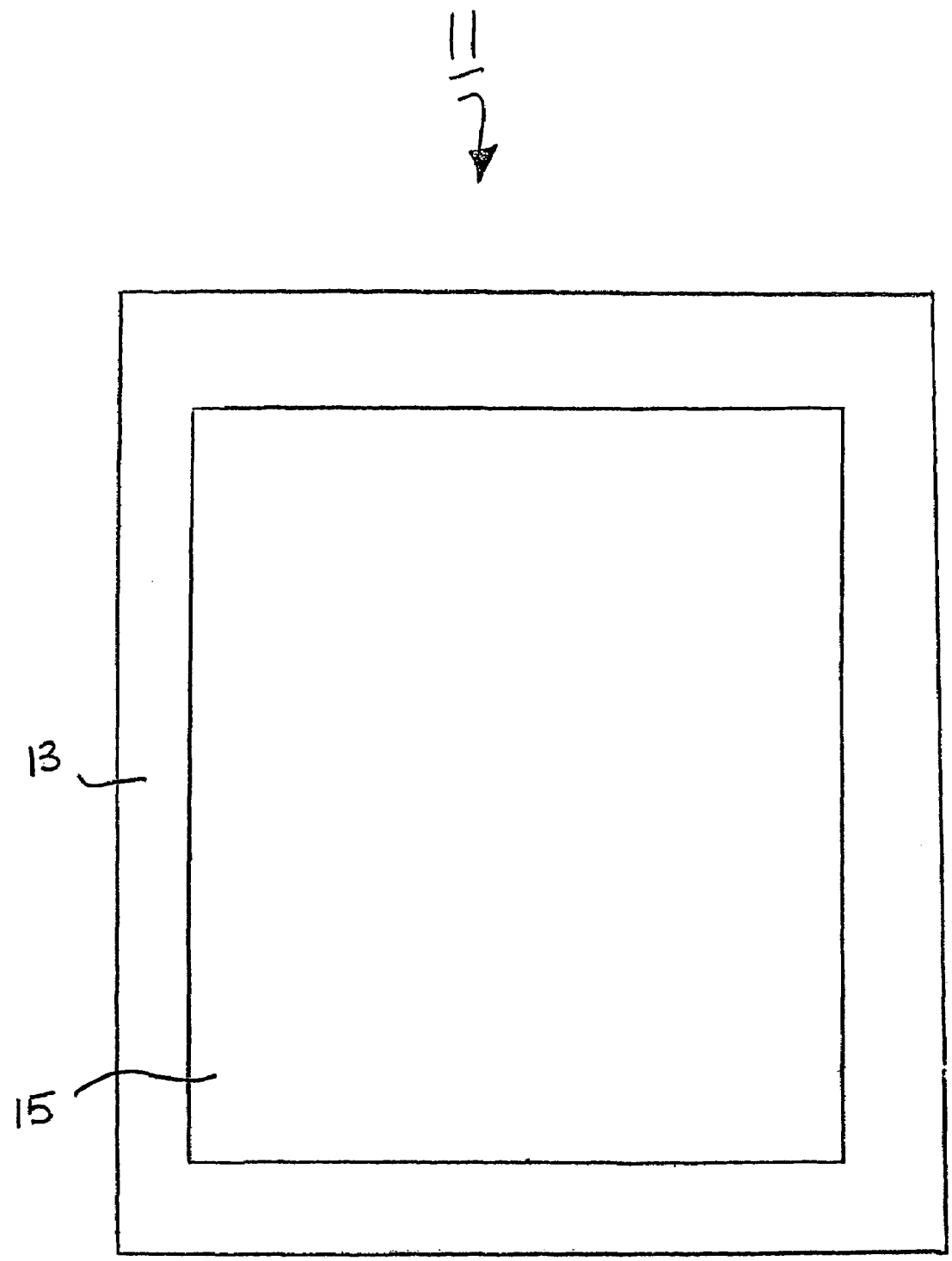
FIG. 1(a) is a schematic top view of a first embodiment of a composite proton exchange membrane constructed according to the teachings of the present invention.

The present invention is based, at least in part, on the discovery that, by treating a desired area of a proton exchange membrane so that the membrane protons and water residing therein are replaced with a cationic polymer, one can alter the characteristics of the proton exchange membrane in the treated area (e.g., by improving tensile strength, by decreasing proton conductivity, by decreasing water and gas permeability, and/or by reducing membrane acidity). Moreover, because the cationic polymer remains substantially stationary within the membrane, the effects of the treatment may be confined to the treated area. Accordingly, the treatment of the proton exchange membrane may be confined to the periphery of the membrane, as is preferably the case for a membrane used in a bipolar stack, or may be directed to both the periphery of the membrane and to interior regions separating and defining active areas of the membrane, as is preferably the case for a membrane used in a segmented cell.

Accordingly, the present invention is directed to a composite proton exchange membrane, said composite membrane comprising (a) a proton exchange membrane; and (b) a cationic polymer incorporated into one or more areas of the proton exchange membrane, said cationic polymer replacing membrane protons in said one or more areas of said proton exchange membrane.

A composite proton exchange membrane of the type described above may be prepared by a process comprising the steps of (a) providing a proton exchange membrane; (b) introducing a cationic monomer into one or more desired areas of the proton exchange membrane; and (c) effecting the polymerization of the cationic monomer.

The proton exchange membrane used to prepare the composite membrane of the present invention is preferably, but need not be, a perfluorosulfonic acid (PFSA) membrane, such as is commercially available from DuPont (Wilmington, Del.) as NAFION® PFSA polymer.

The cationic monomer used to prepare the composite membrane of the present invention must be appropriately sized to impregnate the proton exchange membrane. An example of a suitable cationic monomer is a quaternary salt monomer. Preferred quaternary salt monomers include salts of acrylic, methacrylic or ethynyl esters of quaternary ammonium alkanes and salts of acrylic, methacrylic or ethynyl esters of quaternary ammonium heterocycles.

Preferred classes of the above-mentioned salts of acrylic or methacrylic esters of quaternary ammonium alkanes are represented by the formula

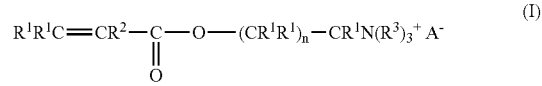

wherein $R^1$ is selected from the group consisting of F and H, $R^2$ is selected from the group consisting of H, a methyl group and a halide, $R^3$ is selected from the group consisting of a methyl group and an ethyl group, n is 0-3, and $A^-$ is an anion with which the cation exhibits solubility in water, such as sulfate and chloride. Examples of specific compounds represented by formula (I) include trimethyl ammonium ethyl acrylate and dimethylammonium ethylmethacrylate.

Preferred classes of the above-mentioned salts of ethynyl esters of quaternary ammonium alkanes are represented by the formula

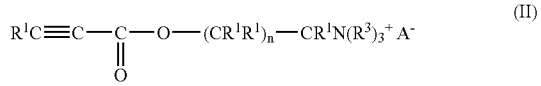

wherein $R^1$ is selected from the group consisting of F and H, $R^2$ is selected from the group consisting of H, a methyl group and a halide, $R^3$ is selected from the group consisting of a methyl group and an ethyl group, n is 0-3, and $A^-$ is an anion with which the cation exhibits solubility in water, such as sulfate and chloride.

Examples of quaternary ammonium heterocycles for use in the above-described salts of acrylic, methacrylic or ethynyl esters of quaternary ammonium heterocycles include, but are not limited to, pyridinium, pyridazinium, pyrimidinium, pyrazinium, imidazolium, pyrazolium, thiazolium, oxazolium and triazolium.

The cationic monomer may be introduced into the one or more desired areas of the proton exchange membrane, for example, by dipping only the desired area(s) of the membrane in a solution containing the cationic monomer. Alternatively, the area(s) of the proton exchange membrane one does not wish to modify may be masked, and a portion of the proton exchange membrane or the entire proton exchange membrane may then be soaked in a solution containing the cationic monomer.

The polymerization of the cationic monomer within the membrane may be promoted by heating the membrane, by irradiating the membrane, or by adding a polymerization catalyst, such as benzoyl peroxide or sodium dithionite, to the membrane. Alternatively, the monomer may simply be allowed to polymerize over time.

The modified areas of the proton exchange membrane exhibit increased strength, reduced water and gas permeability, reduced proton conductivity and reduced acidity. Accordingly, by modifying the periphery of the membrane, one can obtain an integral sealing edge for the membrane, and by modifying certain interior regions of the membrane, one can divide the membrane into a plurality of sealed segments. Moreover, because areas modified in accordance with the present invention exhibit reduced acidity, a proton exchange membrane having a thus modified periphery is less likely to chemically react with a silicone gasket contacted with the membrane periphery. Consequently, the composite membrane of the present invention is compatible with a wider selection of gasket materials than is the case with conventional proton exchange membranes.

Referring now to FIG. 1(a), there is shown a schematic top view of a first embodiment of a composite proton exchange membrane constructed according to the teachings of the present invention, the composite proton exchange membrane being represented generally by reference numeral 11.

Figure 1B:
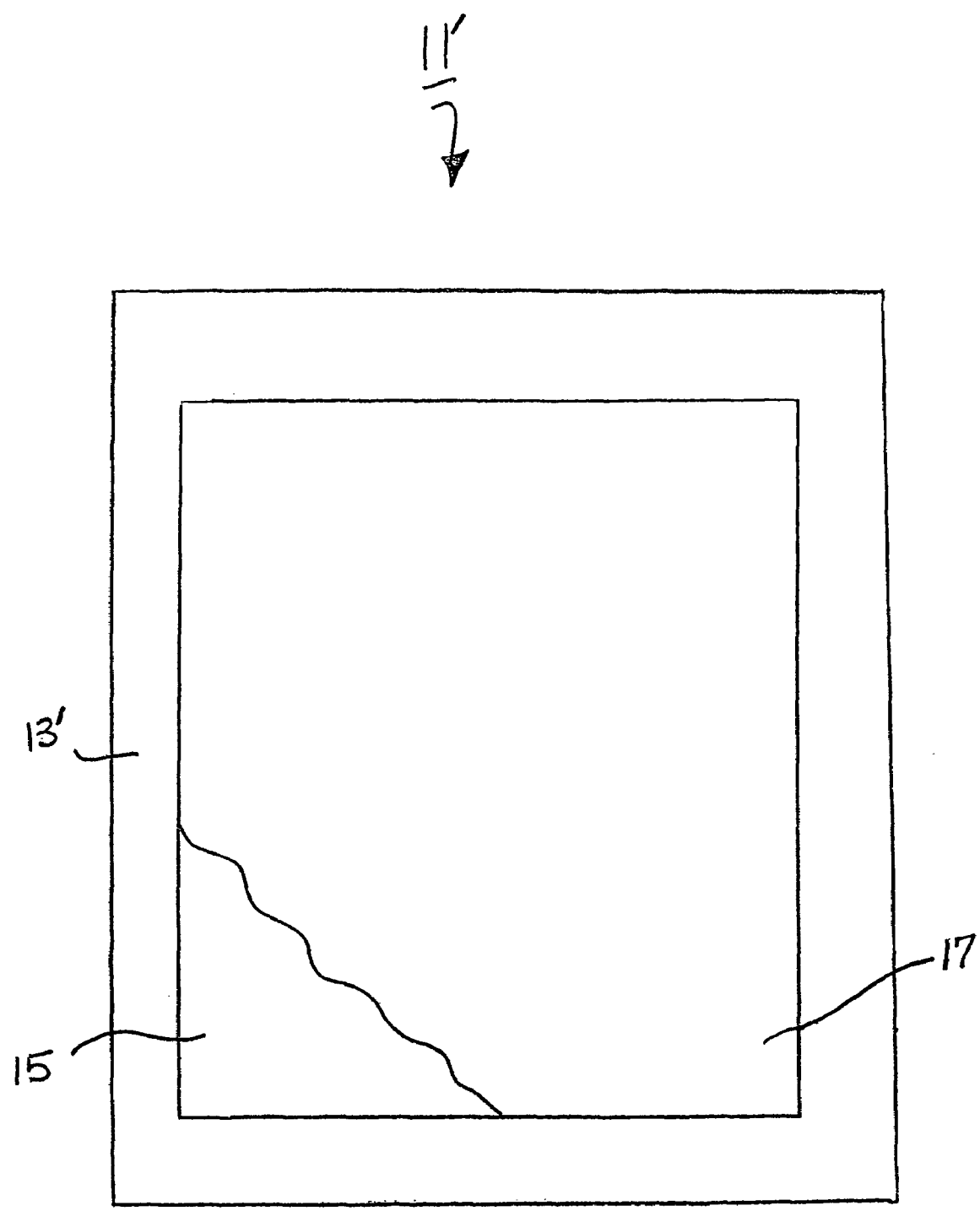
FIG. 1(b) is a schematic top view, broken away in part, of a precursor to the membrane of FIG. 1(a), showing how masks are used to confine the introduction of quaternary salt monomer to the peripheral portion of the proton exchange membrane.

Membrane 11 includes a peripheral portion 13 and an interior portion 15, peripheral portion 13 having been treated in accordance with the teachings of the present invention so as to include a cationic polymer, interior portion 15 not having been so treated. As seen by a precursor membrane 11' shown in FIG. 1(b), in order to confine the cationic polymer of the present invention to the peripheral portion of the membrane, one preferably applies a pair of masks 17 to the opposing faces of interior portion 15 prior to the introduction of the cationic monomer into the unmasked portion 13' of precursor membrane 11'. (It should be noted that only one such mask 17 can be seen in FIG. 1(b).) Masks 17 may be made of a plastic material that is compatible with both the proton exchange membrane and the cationic monomer, examples of such materials including TEFLON® polytetrafluoroethylene and KAPTON® polyimide. After the monomer has been introduced into the unmasked portion 13' of precursor membrane 11', polymerization of the monomer is effected. After polymerization is complete and masks 17 are removed from the opposing faces of interior portion 15 (thus yielding membrane 11), electrodes may be coupled to portion 15 to yield a membrane electrode assembly suitable for use in an electrochemical device.

Figure 2B:
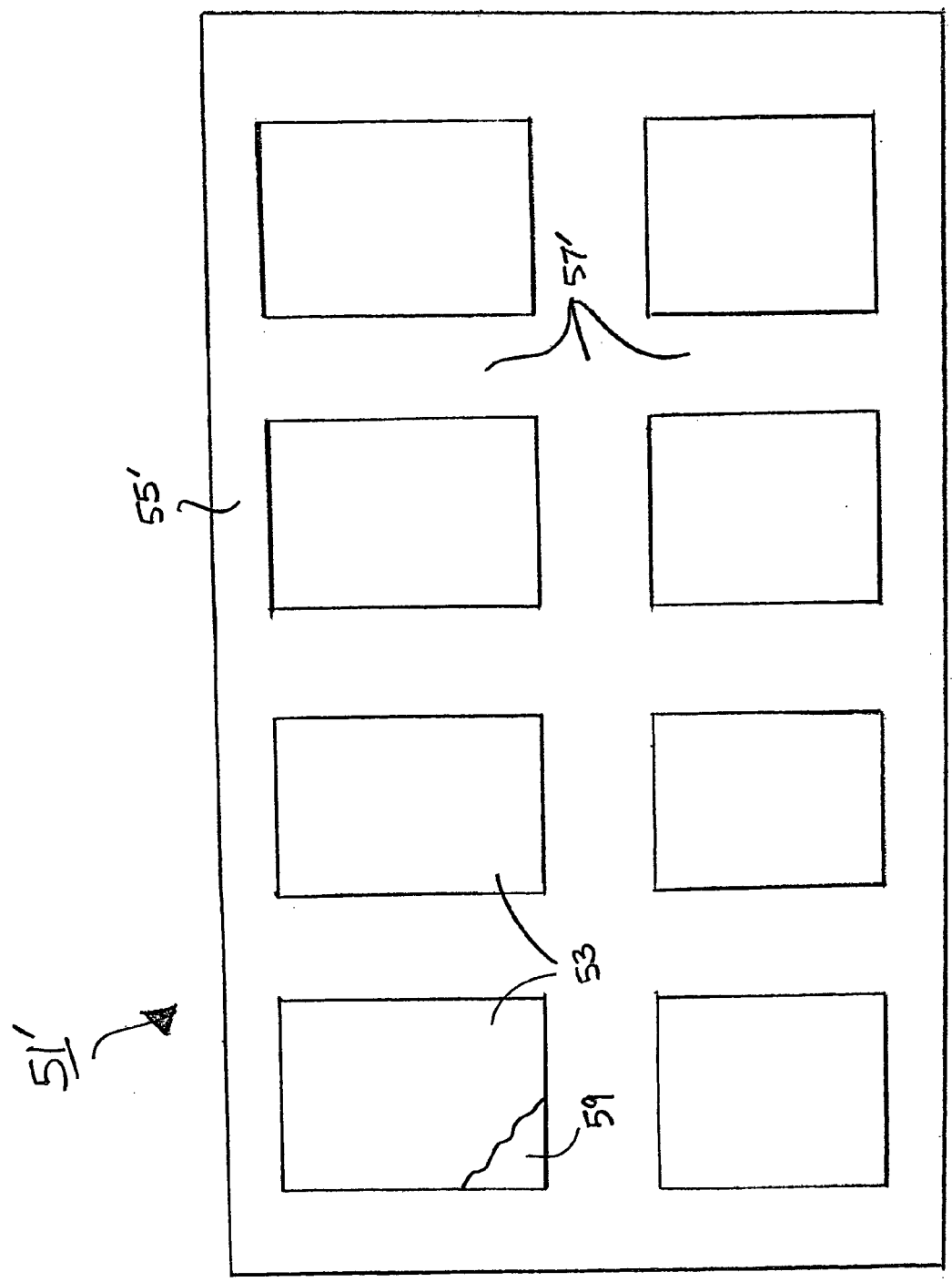
FIG. 2(b) is a schematic top view, broken away in part, of a precursor to the membrane of FIG. 2(a), showing how masks are used to confine the introduction of quaternary salt monomer to the peripheral portion and certain interior portions of the proton exchange membrane.

Referring now to FIG. 2(a), there is shown a schematic top view, broken away in part, of a second embodiment of a composite proton exchange membrane constructed according to the teachings of the present invention, the composite proton exchange membrane being represented generally by reference numeral 51.

Membrane 51 is similar in many respects to membrane 11, the principal differences between the two membranes being that, in membrane 51, a plurality of separate untreated areas 53 are delimited by peripheral portion 55 and interior portions 57 in the membrane. As can be seen by a precursor membrane 51' in FIG. 2(b), in order to define areas 53, one may apply a pair of masks 59 to the opposing faces of each area 53 prior to the introduction of the cationic monomer into precursor membrane 51'. (It should be noted that only one mask from each pair of masks 59 can be seen in FIG. 2(b).) With masks 59 thus applied, the monomer is introduced into precursor membrane 51' not only along an unmasked peripheral portion 55' but also along a plurality of unmasked interior portions 57'. After polymerization of the monomer is complete and masks 59 have been removed (thus yielding membrane 51), a set of electrodes may be coupled to each area 53 to yield a segmented membrane electrode assembly suitable for use in an electrochemical device.

Membranes 11 and 51 can be used in a variety of electrochemical devices including, but not limited to, fuel cells, electrolyzers, electrochemical gas concentrators/compressors (pumps), sensors, supercapacitors, ultracapacitors, and industrial electrochemical process units.

Figure 3:
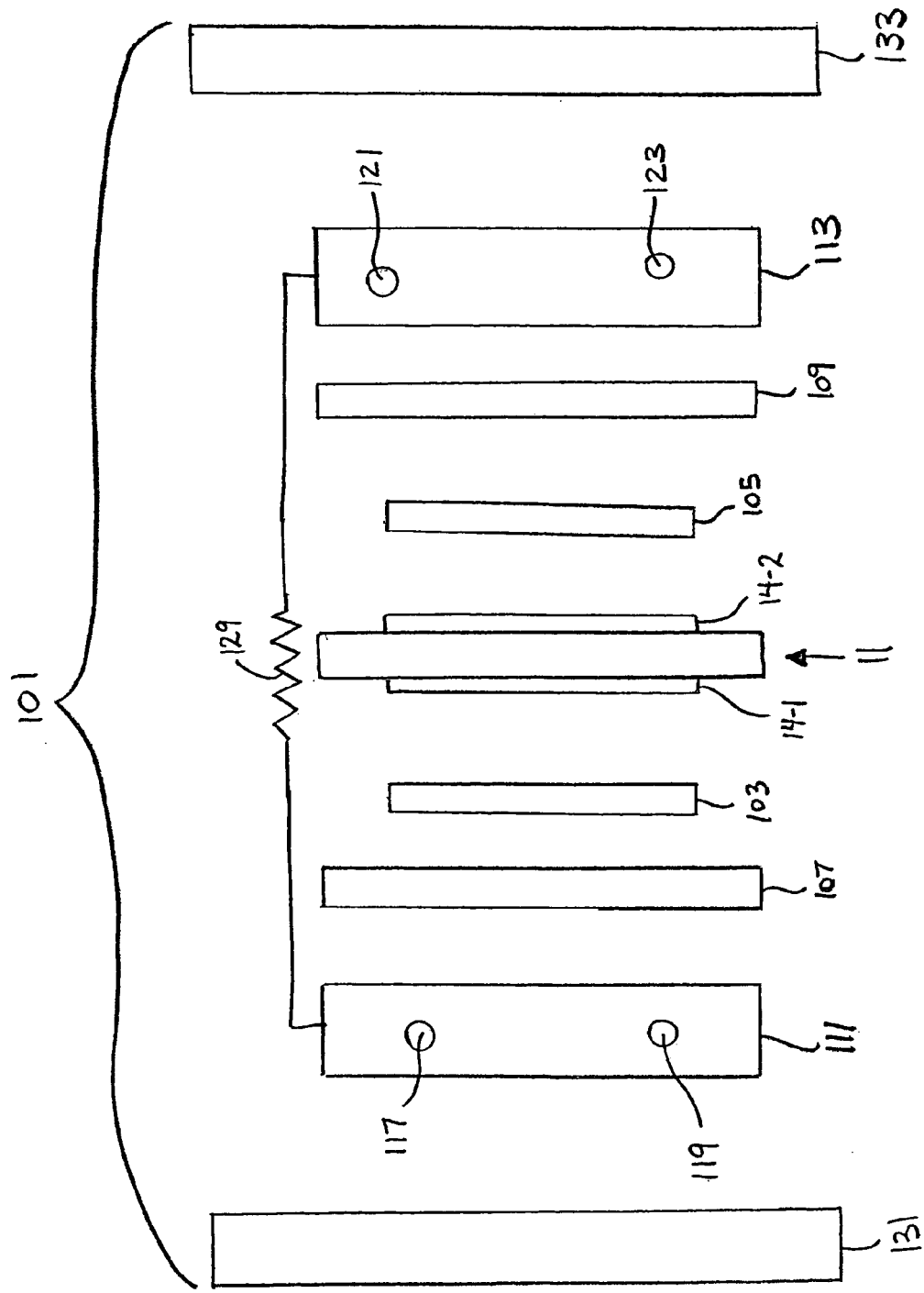
FIG. 3 is a partially exploded schematic side view of an electrochemical device constructed according to the teachings of the present invention, said electrochemical device including the composite proton exchange membrane of FIG. 1.

Referring now to FIG. 3, there is shown a partially exploded schematic side view of one embodiment of an electrochemical device constructed according to the teachings of the present invention, said electrochemical device being represented generally by reference numeral 101.

Device 101, which is described herein as a fuel cell, comprises composite proton exchange membrane 11, an anode 14-1, and a cathode 14-2. Membrane 11, anode 14-1 and cathode 14-2 jointly form a multi-layer composite structure, which is referred to herein as a membrane electrode assembly.

Device 101 also includes a pair of gas diffusion layers 103 and 105, layers 103 and 105 providing fluid distribution and electrical contact with electrodes 14-1 and 14-2, respectively. Gas diffusion layers 103 and 105 may be made of carbon fiber paper.

Device 101 additionally includes a pair of silicone gaskets 107 and 109, gasket 107 being positioned against one face of membrane 11 along its peripheral portion 13 and gasket 109 being positioned against the opposite face of membrane 11 along its peripheral portion 13.

Device 101 further comprises a pair of fluid distribution plates 111 and 113. Plate 111, which serves as a fuel distribution plate and current collector, is shaped to include a fluid cavity (not shown) facing towards anode-side gas diffusion layer 103. An input port 117 and an output port 119 are provided in plate 111, ports 117 and 119 being in fluid communication with the cavity of plate 111 so that fuel can be supplied to the cavity through port 117 and so that by-products and excess fuel can be withdrawn from the cavity through port 119. Plate 113, which serves as an oxidant distribution plate and current collector, is shaped to include a fluid cavity (not shown) facing towards cathode diffusion layer 105. An input port 121 and an output port 123 are provided in plate 113, ports 121 and 123 being in fluid communication with the cavity of plate 113 so that an oxidant can be supplied to the cavity through port 121 and so that by-products and excess oxidant can be withdrawn from the cavity through port 123.

Device 101 also includes an external electrical load 129 connected between fluid distribution plates 111 and 113.

Device 101 further includes a pair of endplates 131 and 133, endplate 131 abutting the outside face of plate 111 and endplate 133 abutting the outside face of plate 113. Endplates 131 and 133 serve to apply axially compressive force to the above-described components of device 101.

Although only one electrochemical cell is shown in device 101, it can readily be appreciated that a plurality of like cells could be arranged in a bipolar configuration between endplates 131 and 133.

The following examples are provided for illustrative purposes only and are in no way intended to limit the scope of the present invention:

EXAMPLE 1

4 ml of a 75% aqueous solution of trimethyl ammonium ethyl acrylate (TMAEA) monomer was mixed with about 4 mg of the polymerization catalyst benzoyl peroxide (BPO), and the resultant mixture was then shaken for 30 seconds. A ½ inch×3 inch dry strip of NAFION® 112 perfluorosulfonic acid membrane (thickness=0.002 inch) was then soaked in 2 ml of the above TMAEA/BPO solution for 1 hour to allow the TMAEA monomer to permeate the membrane strip and to polymerize therewithin. The thus treated membrane strip was then placed in boiling deionized water for 10 minutes to remove excess monomer and catalyst from the membrane strip. Next, the membrane strip was soaked in 1.5 N sulfuric acid at room temperature for 40 minutes to displace any weakly bound monomer from the membrane strip. Next, the membrane was soaked in boiling deionized water for 30 minutes to remove excess sulfuric acid from the membrane strip. The ionic conductivity and the resistance of the membrane strip were then measured. Ionic conductivity was measured using a four-point probe measurement technique at 25° C. and 100% relative humidity. A nearly 10-fold increase in the resistance of the treated membrane strip, as compared to a corresponding untreated membrane, was observed.

The foregoing demonstrates the effectiveness that the present invention has in neutralizing acid groups in ionomers like NAFION® polyfluorosulfonic acid membranes. In devices where a material must be in direct contact with an ionomeric membrane or an ionomer-containing catalyst layer, the above technique will permit the use of acid sensitive materials like silicone.

EXAMPLE 2

The procedure of Example 1 was repeated, except that the membrane strip was not dry initially, but rather, was initially hydrated by boiling in water for 1 hour. The resistance increased nearly 20-fold as compared to a corresponding untreated membrane, showing that the catalyst-initiated polymerization of the monomer drives out water and decreases conductivity.

EXAMPLE 3

The procedure of Example 1 was repeated, except that a ½ inch×1.5 inch strip of NAFION® 112 perfluorosulfonic acid membrane was soaked for about 60 hours in a 75% aqueous solution of TMAEA diluted 1:10. No catalyst was present in the monomer solution.

EXAMPLE 4

The procedure of Example 3 was repeated, except that 1 mg of BPO catalyst was added to the monomer solution promote polymerization of the monomer.

EXAMPLE 5

The procedure of Example 3 was repeated, except that dimethylammonium ethylmethacrylate (DMAEA) monomer was used instead of TMAEA.

EXAMPLE 6

A 4 inch×4 inch piece of NAFION® 112 perfluorosulfonic acid membrane was clamped between two flat blocks of nylon, each block having a ⅛ inch groove. The groove was then filled with a 7.5% solution of DMAEA and allowed to stand for 15 minutes. The membrane was then removed from the fixture and thoroughly rinsed with deionized water to remove excess, unbound monomer. The membrane was then placed in a solution containing the fluorescent tag quinone sulfate, which binds tightly to any available anion sites on the membrane. Under ultraviolet light, the outline of the groove could be clearly seen, proving that the monomer quickly binds in the desired locations and does not quickly migrate to adjoining regions of the membrane.

The results from Examples 1 through 6 above are summarized below in Table I. In addition, the results obtained from a control (an untreated NAFION® 112 perfluorosulfonic acid membrane) are also set forth below in Table I.

| Example | Cure Time (hr) | Initiator | Observed Resistance (Ohms) | Calculated Material Conductivity (S-cm$^{-1}$) |
|---|---|---|---|---|
| NAFION ® 112 Control | — | — | 16,718 | $1 \times 10^{-1}$ |
| 1 | 1 | Yes | 136,600 | $1.2 \times 10^{-2}$ |
| 2 | 1 | Yes | 330,000 | $4.0 \times 10^{-3}$ |
| 3 | 60 | No | 511,711 | $3.8 \times 10^{-4}$ |
| 4 | 60 | Yes | 466,888 | $4.1 \times 10^{-4}$ |
| 5 | 60 | No | 1,512,049 | $1.2 \times 10^{-4}$ |
| 6 | 60 | Yes | 1,421,017 | $1.4 \times 10^{-4}$ |

EXAMPLE 7

The procedure of Example 1 was repeated for a 4.5 inch diameter piece of NAFION® 112 perfluorosulfonic acid membrane, except that sodium disulfate was used as the catalyst instead of benzoyl peroxide. The thus-treated membrane was then placed in a Custom Scientific DSC-135 permeability apparatus. Dry oxygen and nitrogen gas were applied to the membrane, and the permeability of the membrane was measured at different temperatures, pressure differentials and humidities. An untreated NAFION® 112 perfluorosulfonic acid membrane was similarly tested and served as a control. The results of the testing are shown below in Table II. (Permeabilities are expressed in Table II in units of $(cm^3\text{-mil})/(ft^2\text{-Hr-Atm})$.)

TABLE II

| Gas | Humidity | Pressure Differential | Permeability- Treated | Permeability- Untreated | $(P_{untreat}/P_{treat})$ |
|---|---|---|---|---|---|
| $N_2$ | WET | 44 psi | 65.7 | 132 | 2.01 |
| $N_2$ | WET | 17 psi | 41.8 | 136 | 3.24 |
| $N_2$ | DRY | 44 psi | 16.1 | 88 | 5.47 |
| $O_2$ | WET | 44 psi | 124.0 | 257 | 2.07 |
| $O_2$ | WET | 17 psi | 116.3 | 250 | 2.15 |
| $O_2$ | DRY | 44 psi | 79.1 | 240 | 3.03 |

As can be seen, the gas permeability through the treated membrane was reduced by a factor of at least about 2-3, as compared to the control.

EXAMPLE 8

The procedure of Example 3 was repeated, except that the cure time was varied to determine its effect on the ion exchange capacity and the tensile strength of the resulting membrane. The results are shown below in Table III.

TABLE III

| Cure Time (hours) | Tensile Strength $(mN/cm^2)$ | % Elongation | IEC (meq/g) |
|---|---|---|---|
| 0 | 3959.5 | 384 | 0.900 |
| 2 | 4065 | 395.5 | 0.111 |
| 8 | 4771 | 279.5 | 0.114 |
| 22 | 5065.5 | 375 | 0.109 |
| 48 | 5548.5 | 329.5 | 0.120 |

As can be seen, the tensile strength increased as cure time increased. By contrast, ion exchange capacity (IEC) decreased 90% when cure time increased to, as little as 2 hours.

EXAMPLE 9

Figure 4:
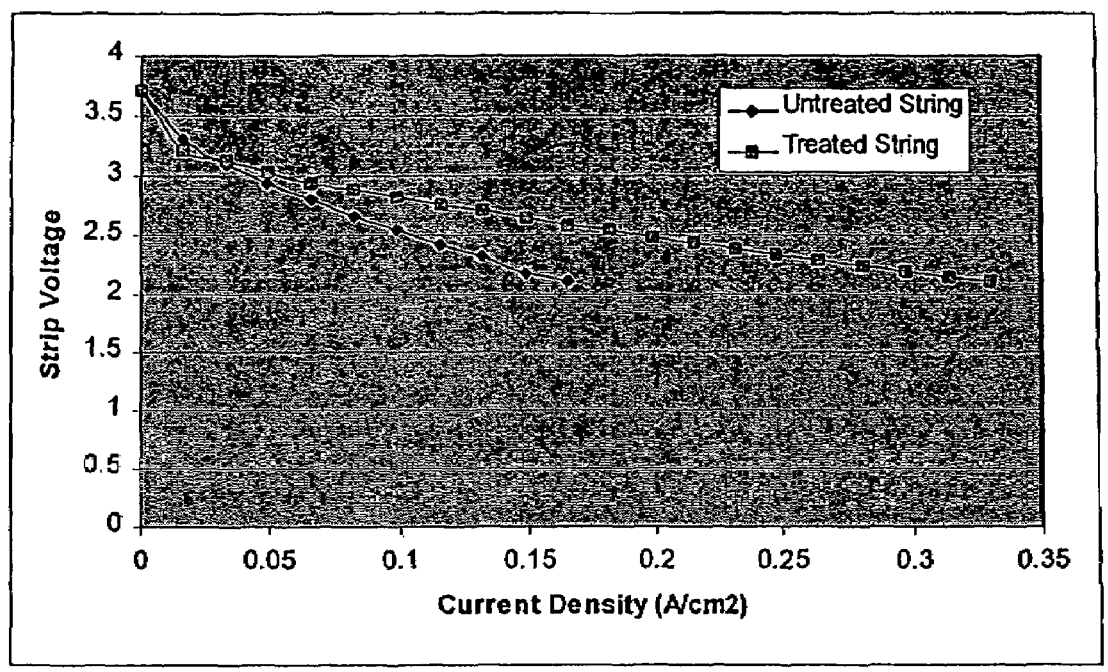
FIG. 4 is a graph depicting the results of Example 9.

Four 6 cm² active regions were masked off from a ½ inch×1.5 inch strip of NAFION® 112 perfluorosulfonic acid membrane by decal-coating onto each side of the membrane 0.4 mg/cm² platinum catalyst with carbon added for conductivity. The areas of the membrane between the four masked regions and the periphery of the membrane surrounding all four masked regions were then treated with trimethyl ammonium ethyl acrylate (TMAEA) monomer using a plastic fixture to define the pattern. After 5 minutes of soak time, the membrane was then removed from the fixture, rinsed thoroughly with deionized water and cured at 80° C. under deionized water. Separate diffusion media were then placed against each face of each active region, and the resulting assembly, with its four segmented cells, was placed in a demountable fuel cell fixture, with its four segmented cells connected in series. In this manner, a flat strip cell with an open circuit voltage of about 3.7 volt was created when water-saturated oxygen gas at 1 atm was applied at a rate of 80 cc/min to one side of the strip and water-saturated hydrogen gas at 1 atm was applied at a rate of 200 cc/min to the other of the strip. The foregoing four-cell strip was operated over a range of current densities at intervals of 0.1 amp/cm², with 5 minutes at each current density. The results of such testing are shown in FIG. 4, together with the results obtained from a corresponding strip prepared using an untreated NAFION® 112 membrane. As can be seen from FIG. 4, there was a measurable improvement in the treated membrane due to the elimination of short circuit paths between cells and a reduction in direct oxygen/hydrogen reaction from gas cross-over in the intercell region.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of preparing a composite membrane, said method comprising the steps of:
   (a) providing a proton exchange membrane;
   (b) introducing a cationic monomer into one or more desired areas of the proton exchange membrane, wherein the cationic monomer is a quaternary salt monomer that includes a cationic component and an anionic component, said cationic component being selected from the group consisting of acrylic, methacrylic and ethynyl esters of quaternary ammonium alkanes and acrylic, methacrylic and ethynyl esters of quaternary ammonium heterocycles, and wherein the quaternary salt monomer is of the formula

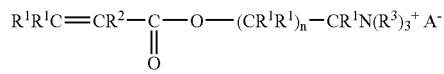

wherein $R^1$ is selected from the group consisting of F and H, $R^2$ is selected from the group consisting of H, a methyl group and a halide, $R^3$ is selected from the group consisting of a methyl group and an ethyl group, n is 0-3, and $A^-$ is an anion with which the cation exhibits solubility in water; and
   (c) effecting the polymerization of the cationic monomer.

2. The method as claimed in claim 1 wherein said proton exchange membrane is a perfluorosulfonic acid proton exchange membrane.

3. The method as claimed in claim 1 wherein said one or more desired areas of the proton exchange membrane consist of the periphery of the proton exchange membrane.

4. The method as claimed in claim 1 wherein said one or more desired areas of the proton exchange membrane comprise the periphery of the proton exchange membrane and one or more interior regions defining a plurality of circumscribed segments.

5. The method as claimed in claim 1 wherein said polymerization effecting step comprises heating the product of step (b).

6. The method as claimed in claim 1 wherein said polymerization effecting step comprises irradiating the product of step (b).

7. The method as claimed in claim 1 wherein said polymerization effecting step comprises exposing the product of step (b) to a free-radical catalyst.

8. The method as claimed in claim 1 wherein A⁻ is selected from the group consisting of sulfate and chloride.

9. A method of preparing a composite membrane, said method comprising the steps of:
(a) providing a proton exchange membrane;
(b) introducing a cationic monomer into one or more desired areas of the proton exchange membrane, wherein the cationic monomer is a quaternary salt monomer that includes a cationic component and an anionic component, said cationic component being selected from the group consisting of acrylic, methacrylic and ethynyl esters of quaternary ammonium alkanes and acrylic, methacrylic and ethynyl esters of quaternary ammonium heterocycles, and wherein the quaternary salt monomer is of the formula

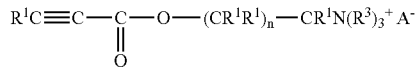

wherein R¹ is selected from the group consisting of F and H, R² is selected from the group consisting of H, a methyl group and a halide, R³ is selected from the group consisting of a methyl group and an ethyl group, n is 0-3, and A⁻ is an anion with which the cation exhibits solubility in water; and
(c) effecting the polymerization of the cationic monomer.

10. The method as claimed in claim 9 wherein A⁻ is selected from the group consisting of sulfate and chloride.

11. The method as claimed in claim 9 wherein said proton exchange membrane is a perfluorosulfonic acid proton exchange membrane.

12. The method as claimed in claim 9 wherein said one or more desired areas of the proton exchange membrane consist of the periphery of the proton exchange membrane.

13. The method as claimed in claim 9 wherein said one or more desired areas of the proton exchange membrane comprise the periphery of the proton exchange membrane and one or more interior regions defining a plurality of circumscribed segments.

14. The method as claimed in claim 9 wherein said polymerization effecting step comprises heating the product of step (b).

15. The method as claimed in claim 9 wherein said polymerization effecting step comprises irradiating the product of step (b).

16. The method as claimed in claim 9 wherein said polymerization effecting step comprises exposing the product of step (b) to a free-radical catalyst.

* * * * *